No. 829,023. PATENTED AUG. 21, 1906.
E. P. LOWER.
RAT, BIRD, AND RABBIT TRAP.
APPLICATION FILED JAN. 23, 1906.
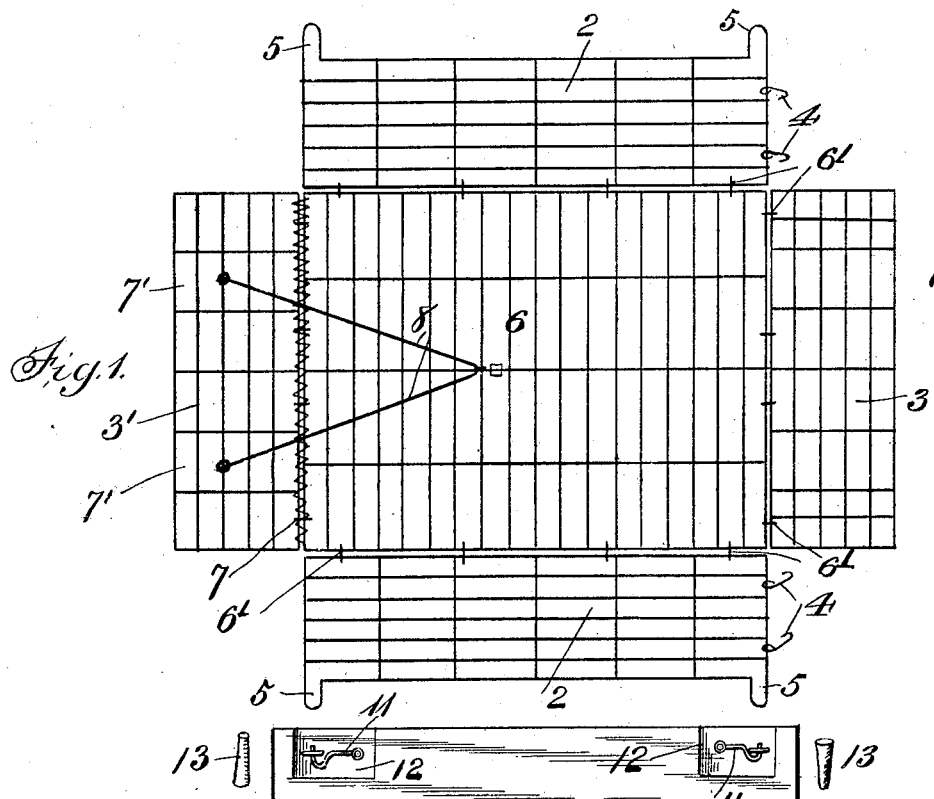
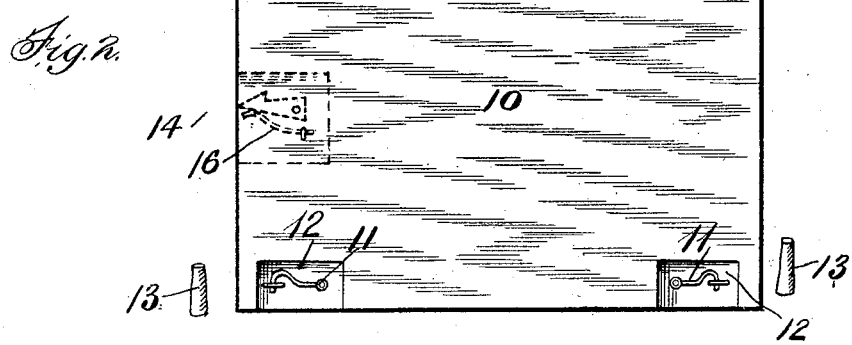
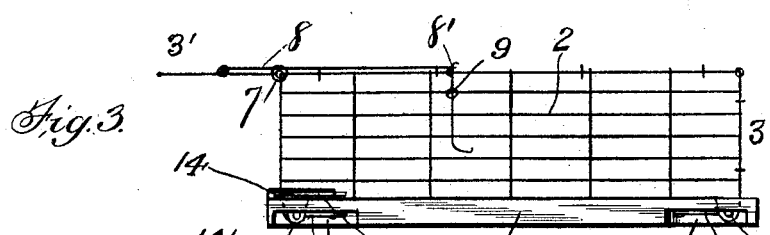

UNITED STATES PATENT OFFICE.

EDWARD P. LOWER, OF HOT SPRINGS, ARKANSAS.

RAT, BIRD, AND RABBIT TRAP.

No. 829,023.  Specification of Letters Patent.  Patented Aug. 21, 1906.

Application filed January 23, 1906. Serial No. 297,394.

*To all whom it may concern:*

Be it known that I, EDWARD P. LOWER, a citizen of the United States, residing at Hot Springs, in the county of Garland and State of Arkansas, have invented new and useful Improvements in Rat, Bird, and Rabbit Traps, of which the following is a specification.

My invention has relation to new and useful improvements in traps, and while it is primarily intended for use as a rat, bird, or rabbit trap it may be used in all cases where applicable.

The object of my invention is the production of a device of this class that can be manufactured at a small cost, be easily packed for shipment, and answer all the purposes of an up-to-date trap.

With these ends in view my invention consists in the novel construction, combination, and arrangement of parts as set forth in the specification and claims hereunto attached.

In the accompanying drawings, in which like parts are designated by like characters throughout the several views, Figure 1 is a plan view of the top of my invention, the side and end pieces being spread out. Fig. 2 is a bottom plan view of my invention, and Fig. 3 is a side elevation of my invention.

My invention is described as follows: The numeral 1 represents the top of my invention, which consists of side pieces 2 and end pieces 3 and 3'. One end of said side pieces 2 is provided with catches 4, one of the ends of which are loosely secured to said side pieces, their outer free ends being adapted to partly encircle corresponding transverse wires of said end piece 3, and thus hold said side and end pieces securely together when the top is in its normal position. Each of said end pieces 2 is provided at each of its ends with downwardly-extending loops 5, the purpose of which will be more fully hereinafter described. Said trap is also provided with a top or upper piece 6, which is hinged to said pieces 2, 3, and 3' by means of hinges 6'. Secured in any desired manner to one of the ends of top 6 and the inner end of said end piece 3' is a coiled spring 7, the purpose of which will be more fully hereinafter described. Hinged at its outer ends near the middle part of said end piece 3' by means of hinges 7' is a V-shaped lever 8, the inner end of which lever is hooked over a hook 8', provided at the upper extremity of a trigger 9, which extends downwardly into my improved trap and is provided with the usual hook for bait. Said lever 8 is fulcrumed near its outer ends over the said coiled spring 7. The numeral 10 represents my improved bottom, which bottom is provided near each corner with a hook 11. The said top of my invention is secured to said bottom 10 by passing said loops 5 of said pieces 2 through perforations provided at each corner of said bottom. Said extensions 5 and hooks 11 are countersunk or brought perfectly flush with the lower face of said bottom by providing said bottom near each corner with a depression 12. If so desired, the said top may be secured to said bottom by pegs 13. Said bottom is also provided with a catch 14 and spring 15, the inner ends of which are secured to the upper face of said bottom.

The operation of my invention is as follows: The different parts being assembled or secured together in the manner described, the bait is placed on the lower hooked end of said trigger. The rat, bird, or rabbit enters the trap and nibbles at the bait, causing said lever 8 to become released and spring upwardly, the action of said transverse spring causing said end piece 3' to be at the same time sprung downwardly and be locked at its lower end in said catch 14, and thus hold said pieces securely in position.

The purpose of having the top of the trap constructed as shown at Fig. 1 is to enable me to fold it, so that it may be conveniently shipped. In doing this the ends 3 and 3' are folded over the top of the top piece 6, in which case the V-shaped lever may be turned on its hinges 7' and be laid down flat on the top piece 6, the side parts being then turned under.

The purpose of the depressions 12 is to countersink the ends of the loops 5 and hooks 11, so that they will not be broken in shipping.

Having described my invention, what I claim as new, and desire to secure by Letters Patent, is—

1. A trap, consisting of a top 1 and bottom 10, said top consisting of side pieces 2, and end pieces 3 and 3'; catches 4, secured at their inner ends to one end of said side pieces 2, their outer free ends being adapted to partly encircle said end pieces 3; downwardly-extending loops 5, provided at each end of said end pieces 2; a top piece 6, hinged to said pieces 2, 3, and 3' by means of hinges 6'; a coiled spring 7, secured to one of the ends of top 6, and inner end of said end piece 3'; a V-shaped lever 8, hinged at its outer ends near the middle part of said end piece 3' by hinges 7'; a trigger 9, provided at its upper extremity with a hook 8', and at its lower end with a bait-hook; a bottom 10, provided near each corner with a perforation and a hook 11, said hooks and extensions 5 being countersunk or brought perfectly flush with the lower face of said bottom by providing said bottom with depressions 12; a catch 14, secured at its inner end to the upper face of said bottom, and a spring 15, also secured at its inner end to the upper face of said bottom, said trap being so constructed that it may be easily and conveniently folded up for shipment, substantially as shown and described and for the purposes set forth.

2. A trap, consisting of a top and bottom, said top consisting of side and end pieces; catches, secured at their inner ends to one end of said side pieces, the outer ends of said catches being adapted to partly encircle said end pieces; downwardly-extending loops, provided at each end of said side pieces; a top piece, hinged to said side and end pieces; a spring, secured to said top piece and the inner end of one of said end pieces; a V-shaped lever, hinged near the middle part of one of said end pieces; a trigger, provided at its upper extremity with a hook, and at its lower end with a bait-hook; a bottom, provided near each corner with a perforation and hook, said hooks being countersunk or brought perfectly flush with the lower face of said bottom by providing said bottom with depressions; a catch, secured at its inner end to the upper face of said bottom, and a spring, secured to the upper face of said bottom at its inner end, said trap being so constructed that it may be folded up and easily packed for shipment, substantially as shown and described and for the purposes set forth.

3. An animal-trap, consisting of a bottom, substantially rectangular in shape, having in each corner and on its lower face a depression and through each depression a perforation; a top, having hinged to each edge, sides provided at each end and extending from their lower edges loops adapted to pass through said perforations; hooks, secured in said depressions, adapted to pass through said loops and secure them in place; end pieces, hinged to the ends of said top, and adapted to be turned down forming a box; hooks, adapted to secure together the ends of said side pieces, and ends of the rear end piece; a spiral spring secured to the front end of said top piece, and the upper edge of said front end piece, and adapted to hold said front end piece down; a spring-lock, secured to the upper face of the bottom, and adapted to lock said front end piece when down, and a lever, hinged to said front piece, fulcrumed on said coiled spring, and adapted to hold up said front piece, and be held down by a bait-trigger, substantially as shown and described and for the purposes set forth.

In testimony whereof I affix my signature in presence of two subscribing witnesses.

EDWARD P. LOWER.

Witnesses:
LIZZIE PANSZE,
R. D. L. BOSWELL.